(12) United States Patent
Tessier

(10) Patent No.: US 8,294,614 B2
(45) Date of Patent: Oct. 23, 2012

(54) APPARATUS FOR SATELLITE TELECOMMUNICATIONS

(76) Inventor: Thomas Ronald Tessier, Winnipeg (CA)

(*) Notice: Subject to any disclaimer, the term of this patent is extended or adjusted under 35 U.S.C. 154(b) by 354 days.

(21) Appl. No.: 12/491,779

(22) Filed: Jun. 25, 2009

(65) Prior Publication Data

US 2010/0328153 A1    Dec. 30, 2010

(51) Int. Cl.
*G01S 19/34* (2010.01)
(52) U.S. Cl. .................................. 342/357.74
(58) Field of Classification Search ............ 342/357.25, 342/357.46, 357.74, 419; 701/213, 215
See application file for complete search history.

(56) References Cited

U.S. PATENT DOCUMENTS 5,470,233 A * 11/1995 Fruchterman et al. ........ 434/112
6,083,248 A * 7/2000 Thompson ..................... 607/30
6,683,538 B1 * 1/2004 Wilkes, Jr. .................... 340/903

* cited by examiner

*Primary Examiner* — Dao Phan
(74) *Attorney, Agent, or Firm* — Adrian D. Battison; Ade & Company Inc.

(57) ABSTRACT

A mobile communication device includes a GPS system and a communication system through a low-earth orbit communication satellites or geosynchronous satellite. The processing system periodically calculates from GPS a current position which is compared to a saved position and saved if the amount of movement is greater than a set distance and also transmits each calculated position. In order to reduce power consumption, in the event that at least one and preferably several calculated differences between the current position and the previously saved position is less than the predetermined set distance, the processing system is placed in an idle mode in which position is transmitted at a lower frequency. The position is periodically calculated and as soon as the position changes the system is returned from idle. In order to keep remote recipients informed signals indicating entry into and return from the idle mode are transmitted with the position signals.

14 Claims, 4 Drawing Sheets

APPARATUS FOR SATELLITE TELECOMMUNICATIONS

This invention relates to an apparatus for satellite telecommunications comprising a mobile communication device for movement over the earth to different locations which includes a first system for receiving signals from the Global Positioning System (GPS) satellites and a second system for communication with a communication satellite system such as a low earth orbit system that contains multiple satellites that each pass overhead in and out of view to the communication device, or a geosynchronous satellite.

This application is related to the subject matter disclosed in U.S. application Ser. No. 12/120,287 filed May 14, 2008 which corresponds to Canadian application no. 2,633,051 filed May 12, 2008, the disclosure of which is incorporated herein by reference.

BACKGROUND OF THE INVENTION

Apparatus of this type are well known and attempts are being made at all times to improve the operation and portability of these devices so that they can be carried by many persons travelling in remote locations where their safety may be compromised.

One area of continual difficulty is that of the battery power supply so that efforts to reduce power usage remain a high priority.

One way to reduce power usage is to require the user to turn off the system when not required for example when the user is stationary in camp. However the user cannot always be relied upon to remember such details particularly where the environment is stressful.

SUMMARY OF THE INVENTION

It is one object of the invention to provide an apparatus of this general type where the periodically calculated position is periodically transmitted for receipt by persons monitoring the location of the apparatus which allows a reduction in power consumption.

According to one aspect of the invention there is provided a mobile communication device for transport by a user in movement over the earth to different locations comprising:
   a portable housing;
   a battery power supply mounted in the portable housing;
   a processing system and memory mounted in the housing;
   an antenna mounted in the housing;
   the processing system having a first communication system for receiving signals through the antenna from Global Positioning System (GPS) satellites;
   the processing system having a second communication system for communication through the antenna with a communication satellite system;
   the processing system being arranged to periodically calculate from the GPS signals a calculated current position of the apparatus;
   the processing system being arranged periodically, at a set frequency, to calculate a difference between the calculated current position with a previously saved calculated current position to determine whether the apparatus has moved by a distance greater than a set trigger distance;
   the processing system being arranged, when activated, to transmit periodically through the second communication system at the set frequency a position signal indicative of the calculated current position;
   the processing system being arranged, in the event that at least one calculated difference between the calculated current position and the previously saved calculated current position is less than the set trigger distance, to place the processing system in an idle mode in which the processing system is halted from transmitting the position signal through the second communication system at the set frequency.

Preferably, in the idle mode, the processing system is arranged to transmit the position signal through the second communication system periodically at a second set frequency which is lower than said set frequency.

Preferably the second set frequency is adjustable by the user.

Preferably, in the event that the processing system is placed into the idle mode, the processing system is arranged to transmit with the position signal through the second communication system a signal that the idle mode is activated.

Preferably, in the idle mode, the processing system is arranged to transmit the position signal through the second communication system periodically at a second set frequency which is lower than said set frequency and wherein the signal that the idle mode is activated includes data defining the second lower frequency.

Preferably, in the idle mode, the processing system is arranged periodically to calculate a difference between the calculated current position with a previously saved calculated current position to determine whether the apparatus has moved by a distance greater than said set trigger distance and, in the event that the distance moved is greater than said set trigger distance, to return the system out of the idle mode.

Preferably, in the event that the processing system is returned from the idle mode, the processing system is arranged to transmit with the position signal through the second communication system a signal that the idle mode is de-activated.

Preferably, in the idle mode, the processing system is arranged at the set frequency, to calculate a difference between the calculated current position with a previously saved calculated current position to determine whether the apparatus has moved by a distance greater than said set trigger distance and, in the event that the distance moved is greater than said set trigger distance, to return the system out of the idle mode.

Preferably the processing system is arranged such that the calculated current position is only saved as a saved calculated current position if the difference between the calculated current position and the previously saved calculated current position is greater than the set trigger distance.

Preferably the second communication system is arranged for transmit and receive bi-directional communication.

Preferably the processing system is arranged to be returned out of the idle mode by receipt of a signal from a remote person received on the second communication system.

Preferably the second communication system is arranged for transmit-only communication.

Preferably the processing system is placed in the idle mode in the event that a plurality of calculated differences from a previously saved calculated current position are less than the set trigger distance.

Preferably the number of calculated differences required to place the processing system in the idle mode is adjustable by the user.

The communication satellite system can be a low earth orbit system that contains multiple satellites that each pass overhead in and out of view to the communication device, or can be a geosynchronous satellite system.

Thus a unique feature of the device is the idle menu setting. When enabled, this function reduces the number of routine position transmissions made by the device if it detects that the unit has not moved more than the idle mode trigger distance which can be about 100 meters for the time or the number of calculations made which is specified in the menu. This saves power and air time usage in situations where a device is carried by a traveler and the traveler stops for an extended period. This feature ensures conservation as the unit does not have to be turned off and on again in order to save air time and power. Once the idle timer utility detects that it has not moved in the time specified in the menu, positions are transmitted at the lower frequency determined by the interval specified in the bottom of the idle menu.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
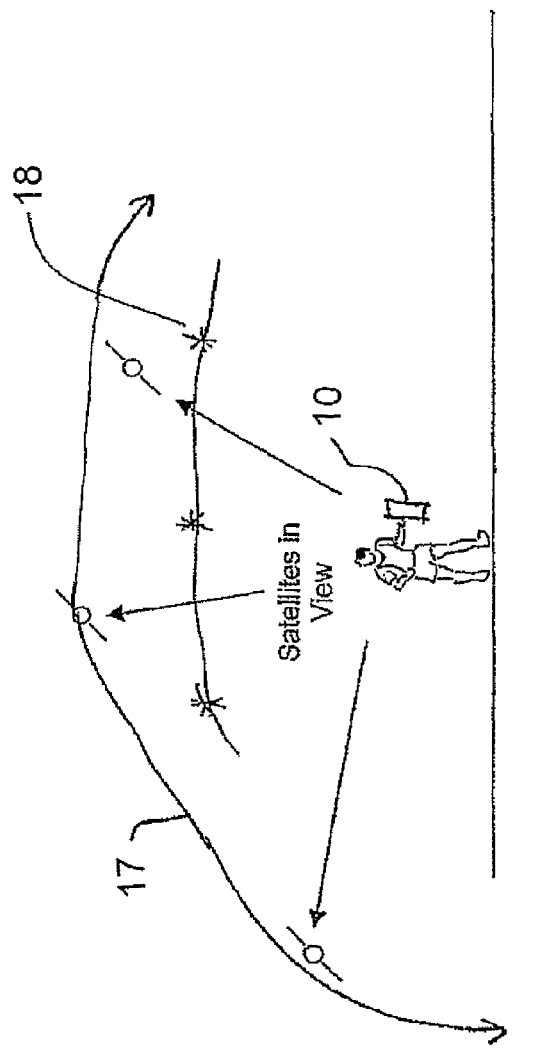
FIG. 1 is a schematic illustration of a person carrying an apparatus for satellite telecommunications according to the present invention.
Figure 2:
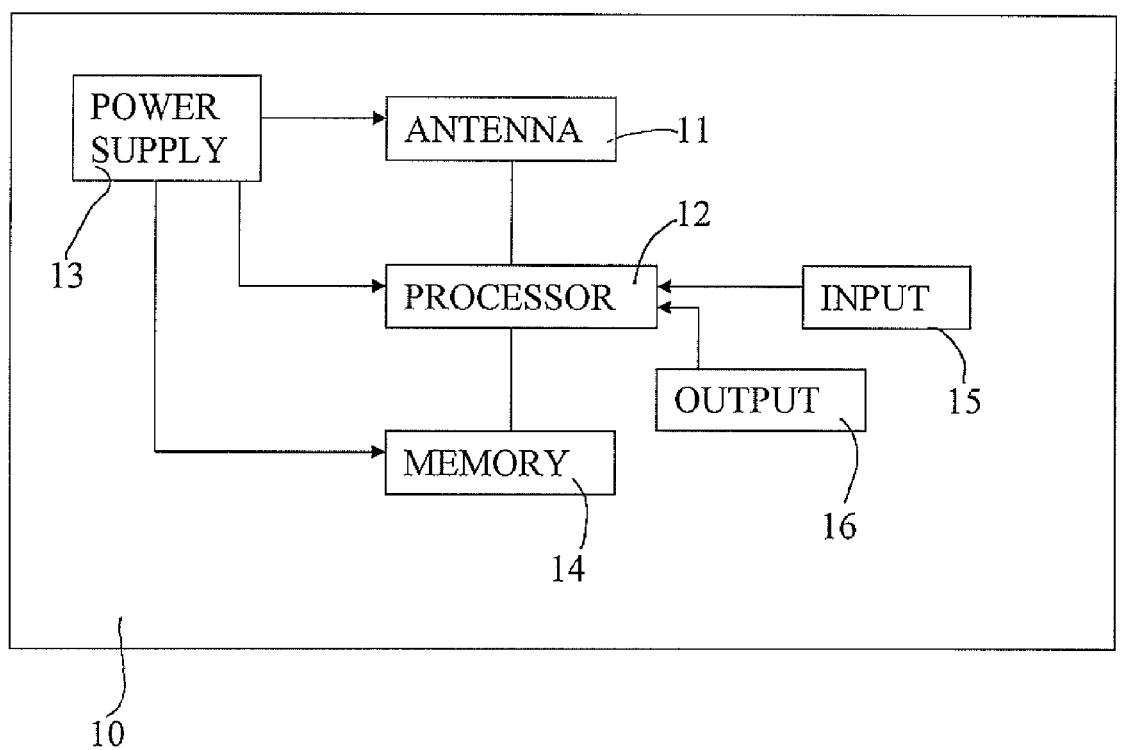
FIG. 2 is a schematic illustration the apparatus of FIG. 1 for satellite telecommunications according to the present invention.

The apparatus as shown in FIGS. 1 and 2 includes a portable device 10 which includes an antenna or antennas 11 for communications with the GPS satellite system 17 and the telecommunications satellite system 18, a processor 12 for carrying out the communications protocols described hereinafter, a power supply 13 which is generally a battery, a memory 14 of the processor, an input 15 for the user to enter or enable communications to be transmitted and an output 16 for communicating the received communications to the user. Communications may be initiated on user command or may be initiated by an automatic system using a trigger condition such as a timer. In such case, there may be no user interface at all, other than a power switch.

The apparatus uses the protocols described above together with the well known protocols necessary for GPS location detection and for two way telecommunication with a low earth orbit communication satellite system. These protocols are not described herein as they are well known to persons skilled in this art.

The arrangement described wherein provides a feature for rationing air time and battery power for the satellite device.

The rationale is that if the device is stationary for a long period of time, such as a camper being asleep in their tent overnight, it is undesirable to pay for connect time and more importantly use up battery power to keep reporting exactly the same position repeatedly.

The idle algorithm option is enabled by the user on user input 15. Once enabled, the user sets the parameters using the same input system. There are two:

(1) Setting the minimum time or number of calculations carried out in which the device must see consecutive GPS readings within a trigger distance such as a 100 meter radius in order to enter the idle mode and to invoke a reduction in the number of position report transmissions over time.

(2) Setting the interval time in which the unit will periodically send a position report in the idle mode, in order that people monitoring the unit can confirm it is indeed still working.

For example, the device may nominally send routine position reports out once every 10 minutes. A user may set parameter (1) to 30 minutes of sitting in one spot, and parameter (2) to set the unit to send out a position report every 120 minutes once the idle algorithm is invoked.

Figure 3A:
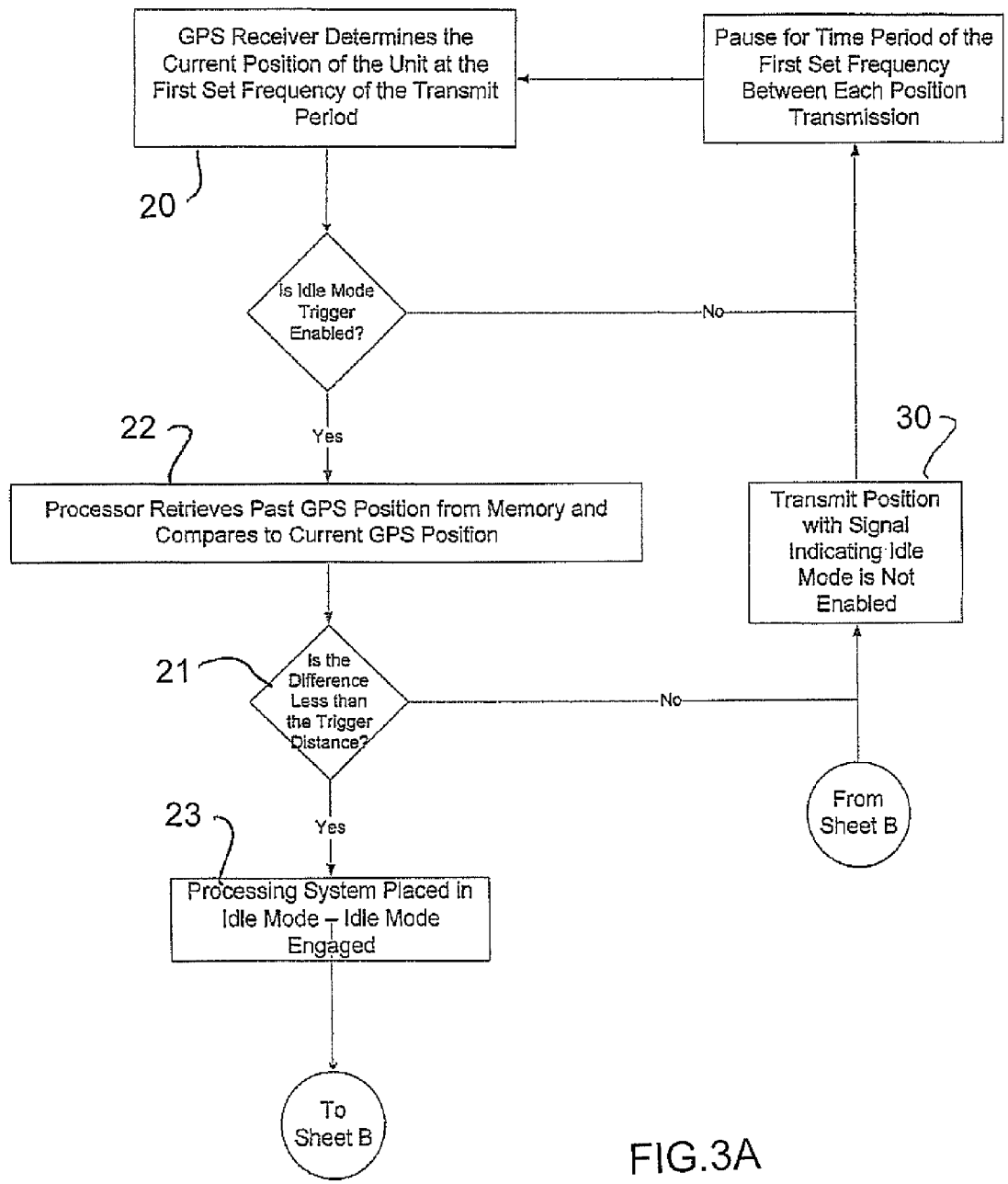
FIG. 3 is a flow chart for the calculations for the apparatus for satellite telecommunications of FIGS. 1 and 2.
Figure 3B:
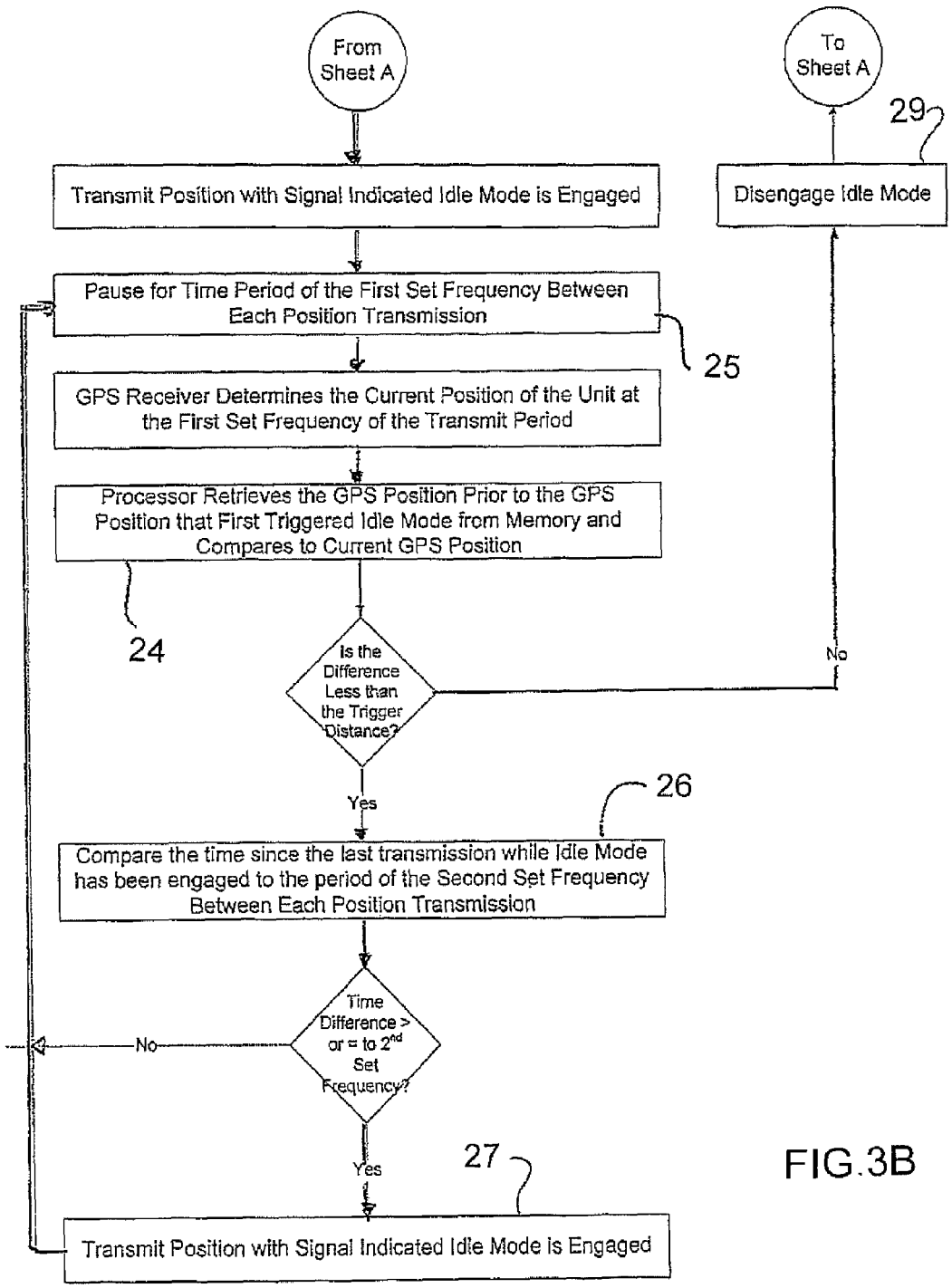

Referring to the flow chart of FIG. 3, it can be seen that in operation:

1. The algorithm checks the GPS position at step 20 and calculates at step 21 the difference from the earlier position retrieved at step 22 to see if it is necessary to activate the idle mode at step 23 to invoke the reduction in transmissions. It can use a means such as calculating the Great Circle Route using the Haversine Formula, or spherical trigonometry, or other trigonometry methods, or a simple means of comparing latitude/longitude positions with a look-up table to compensate for convergence of longitude lines as the latitude moved toward a pole.

2. If the idle mode is enabled, the comparison is made between a saved position and the most recent position or calculated position. Anytime the comparison shows the most recent position is more than the trigger distance, which can be set at 100 meters or other pre-determined distance from the saved comparison position, the latest position now becomes the saved position and the next GPS position is compared to this saved number. And so it goes until the positions start being within the set trigger distance. Once this is the case, the saved position is not over-written until another position is outside the set trigger distance and the comparisons start over again. That is where the distance is less than the trigger distance, the processor retrieves from memory 14 at step 24 the GPS position prior to the position that first triggered the idle mode and compares that GPS position with the current position.

3. To check if the device did indeed move farther than the set distance, even when the function is invoked, it wakes up at the original routine interval, or at the set frequency, to check the GPS reading as shown at step 25. If the reading shows it has not moved the set distance, and not enough time has elapsed to send a periodic message according to the second lower frequency set by the user as determined by step 26, the unit immediately goes to sleep or enters the idle mode.

4. Once the idle algorithm is invoked, a bit is set in the next outgoing message that indicates it is set as indicated at step 27. This alerts the person monitoring positions remotely such as on a web page or transmission database table display that idle is invoked and they should not expect transmissions at the routine times, but only according to the lower frequency idle algorithm intervals set in the second idle parameter in the field tracker. The message can also include this value of the frequency so the user knows what that interval is.

5. The idle algorithm is cancelled at step 29 when there is a GPS position that is outside the set distance radius of the original position that was used as the comparison. The bit that indicates idle algorithm enabled/disabled state in the outgoing position report messages is then set to 0 (cleared) so now the person monitoring the position of the tracker using the web page will know that routine position reports can be expected at the set frequency when the next position signal is transmitted at step 30 with the signal indicating the Idle mode is not enabled.

6. The system can also include the feature (not shown in FIG. 3) that a person monitoring the device from the web page wants to get updates from the device more often, or wants to be able to send messages or otherwise control the device more often than the currently invoked idle algorithm will allow, the person monitoring the web page has the option of sending a configuration command to the device that will (1) cancel the idle mode altogether and/or (2) change the frequency that the position reports are sent.

If the device is not in the idle mode and the device is set to transmit a routine position report at some set interval, such as once every 15 minutes, the device will wake up every 15 minutes to check position and transmit a position report. If after a plurality of consecutive report intervals, which can be for example set at four, it realizes it has not moved the set distance, the idle mode is started. Once idle mode starts, the device will still wake up each 15 minutes as expected and check its location. If it has not moved more than the trigger distance from the point where idle was started, it will only transmit at the lower frequency, that is if the second set time has expired. In one example, that could be once every fourth transmission time. Since the transmission interval is normally 15 minutes, the idle interval can be 50 minutes.

If, at any time the device wakes up and realizes it has moved more than the trigger distance from the original position where idle was started, idle is then cancelled and it resumes transmitting at regular transmission intervals. It will not enter idle mode again until there are the same set plurality or time interval of readings with the same location.

When idle mode starts, the fact that idle mode has started is included in messages sent so anyone monitoring the progress of the traveler from the user web portal would know they should not expect transmissions as often. When idle mode is stopped and it resumes transmitting on the normal timing schedule, the person monitoring also will see this in the messages and will know they can expect position report transmissions at the routine time.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A mobile communication device for transport by a user in movement over the earth to different locations comprising:
   a portable housing;
   a battery power supply mounted in the portable housing;
   a processing system and memory mounted in the housing;
   an antenna mounted in the housing;
   the processing system having a first communication system for receiving signals through the antenna from Global Positioning System (GPS) satellites;
   the processing system having a second communication system for communication through the antenna with a communication satellite system;
   the processing system being arranged to periodically calculate from the GPS signals a calculated current position of the apparatus;
   the processing system being arranged periodically, at a set frequency, to calculate a difference between the calculated current position with a previously saved calculated current position to determine whether the apparatus has moved by a distance greater than a set trigger distance;
   the processing system being arranged, when activated, to transmit periodically through the second communication system at the set frequency a position signal indicative of the calculated current position;
   the processing system being arranged, in the event that at least one calculated difference between the calculated current position and the previously saved calculated current position is less than the set trigger distance, to place the processing system in an idle mode in which the processing system is halted from transmitting the position signal through the second communication system at the set frequency.

2. The apparatus according to claim 1 wherein said set frequency defines a first set frequency and wherein, in the idle mode, the processing system is arranged to transmit the position signal through the second communication system periodically at a second set frequency which is lower than said first set frequency.

3. The apparatus according to claim 2 wherein the second set frequency is adjustable by the user.

4. The apparatus according to claim 1 wherein, in the event that the processing system is placed into the idle mode, the processing system is arranged to transmit with the position signal through the second communication system a signal that the idle mode is activated.

5. The apparatus according to claim 4 wherein said set frequency defines a first set frequency and wherein, in the idle mode, the processing system is arranged to transmit the position signal through the second communication system periodically at a second set frequency which is lower than said first set frequency and wherein the signal that the idle mode is activated includes data defining the second set frequency.

6. The apparatus according to claim 1 wherein, in the idle mode, the processing system is arranged periodically to calculate a difference between the calculated current position with a previously saved calculated current position to determine whether the apparatus has moved by a distance greater than said set trigger distance and, in the event that the distance moved is greater than said set trigger distance, to return the system out of the idle mode.

7. The apparatus according to claim 6 wherein, in the event that the processing system is returned from the idle mode, the processing system is arranged to transmit with the position signal through the second communication system a signal that the idle mode is de-activated.

8. The apparatus according to claim 1 wherein, in the idle mode, the processing system is arranged at the set frequency, to calculate a difference between the calculated current position with a previously saved calculated current position to determine whether the apparatus has moved by a distance greater than said set trigger distance and, in the event that the distance moved is greater than said set trigger distance, to return the system out of the idle mode.

9. The apparatus according to claim 1 wherein the processing system is arranged such that the calculated current position is only saved as a saved calculated current position if the difference between the calculated current position and the previously saved calculated current position is greater than the set trigger distance.

10. The apparatus according to claim 1 wherein the second communication system is arranged for transmit and receive bi-directional communication.

11. The apparatus according to claim 10 wherein the processing system is arranged to be returned out of the idle mode by receipt of a signal from a remote person received on the second communication system.

12. The apparatus according to claim 1 wherein the second communication system is arranged for transmit-only communication.

13. The apparatus according to claim 1 wherein the processing system is placed in the idle mode in the event that a plurality of calculated differences from a previously saved calculated current position are less than the set trigger distance.

14. The apparatus according to claim 13 wherein the number of calculated differences required to place the processing system in the idle mode is adjustable by the user.

* * * * *